(12) United States Patent
Lasagni et al.

(10) Patent No.: US 10,438,515 B2
(45) Date of Patent: Oct. 8, 2019

(54) LABELING ELEMENT FOR ITEMS

(71) Applicants: FRAUNHOFER-GESELLSCHAFT ZUR FOERDERUNG DER ANGEWANDTEN FORSCHUNG e.V., Munich (DE); TECHNISCHE UNIVERSITAET DRESDEN, Dresden (DE)

(72) Inventors: Andres Fabian Lasagni, Grumbach (DE); Tim Kunze, Dresden (DE); Florian Roessler, Dresden (DE)

(73) Assignees: FRAUNHOFER-GESELLSCHAFT ZUR FOERDERUNG DER ANGEWANDTEN FORSCHUNG E.V., Munich (DE); TECHNISCHE UNIVERSITAET DRESDEN, Dresden (DE)

(*) Notice: Subject to any disclaimer, the term of this patent is extended or adjusted under 35 U.S.C. 154(b) by 36 days.

(21) Appl. No.: 15/617,638

(22) Filed: Jun. 8, 2017

(65) Prior Publication Data

US 2017/0358249 A1 Dec. 14, 2017

(30) Foreign Application Priority Data

Jun. 8, 2016 (DE) .......................... 10 2016 210 119
Aug. 15, 2016 (DE) .......................... 10 2016 215 160

(51) Int. Cl.
*G09F 3/02* (2006.01)
*B32B 27/08* (2006.01)
(Continued)

(52) U.S. Cl.
CPC ............... *G09F 3/02* (2013.01); *B32B 27/08* (2013.01); *G02B 5/1842* (2013.01);
(Continued)

(58) Field of Classification Search
None
See application file for complete search history.

(56) References Cited

U.S. PATENT DOCUMENTS 6,271,967 B1 * 8/2001 Stork .................. G06K 19/16
283/85
6,342,969 B1 * 1/2002 Lee .................... G02B 5/1842
359/2

(Continued)

FOREIGN PATENT DOCUMENTS

| DE | 102011014114 B3 | 5/2012 |
| DE | 102012105571 A1 | 1/2014 |
| DE | 102013105246 A1 | 11/2014 |

*Primary Examiner* — Laura C Powers
(74) *Attorney, Agent, or Firm* — Jacobson Holman, PLLC.

(57) ABSTRACT

The present invention relates to a labeling element for items, which on a surface thereof is formed with a plurality of pixels with periodic lattice structures, in particular linear lattice structures. Lattice structures with in each case one structural period Λ and an alignment of the structural elements, which are aligned to one another in particular in a linear parallel manner, at an angle φ with respect to an axis of reference are formed in individual pixels such that when the pixels constituting the labeling element are irradiated with electromagnetic radiation, preferably monochromatic electromagnetic radiation, an image of the labeling element is created on an detector array or a surface, by means of images of at least one order of diffraction of the electromagnetic radiation diffracted by pixels which can be used for identification of the respective labeling element.

9 Claims, 11 Drawing Sheets

(51) Int. Cl.
*G02B 5/18* (2006.01)
*G09F 19/18* (2006.01)
*G09F 3/00* (2006.01)

(52) U.S. Cl.
CPC ......... *G02B 5/1861* (2013.01); *G09F 3/0294* (2013.01); *G09F 19/18* (2013.01); *B32B 2519/00* (2013.01); *G09F 2003/0213* (2013.01); *G09F 2003/0276* (2013.01)

(56) References Cited

U.S. PATENT DOCUMENTS

| | | |
|---|---|---|
| 9,676,156 B2 | 6/2017 | Tompkin et al. |
| 2015/0192897 A1 | 7/2015 | Schilling et al. |
| 2016/0167422 A1 | 6/2016 | Brehm et al. |

* cited by examiner

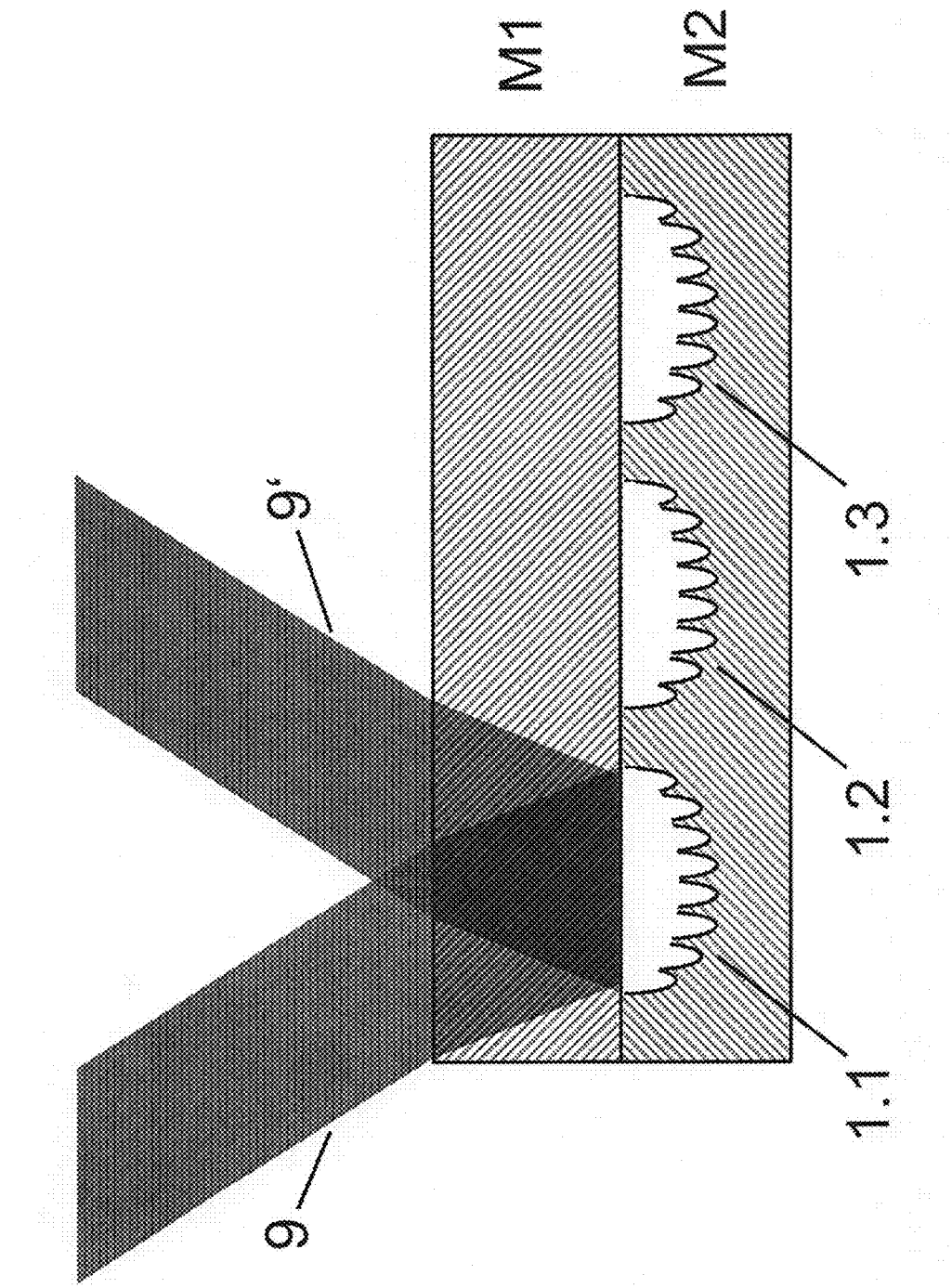

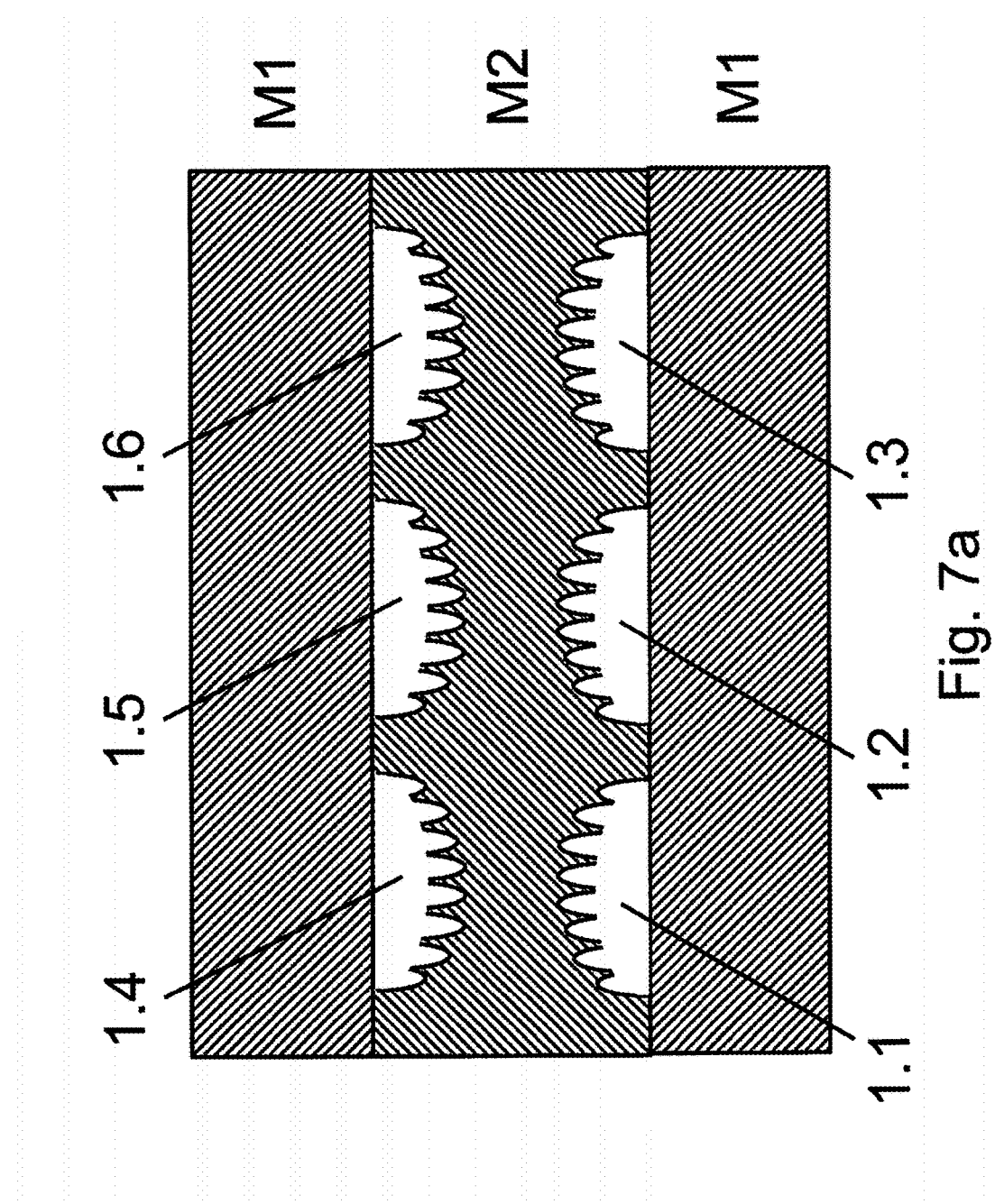

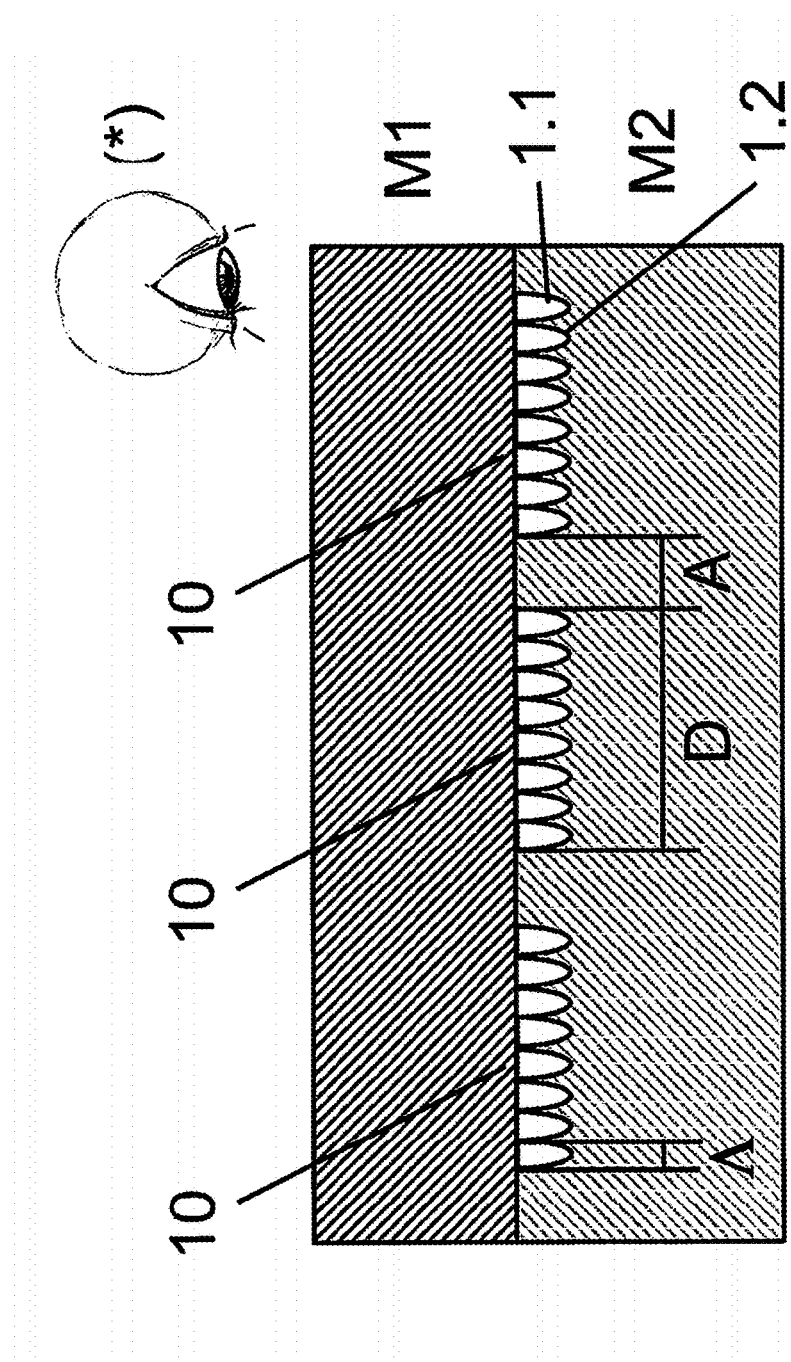

LABELING ELEMENT FOR ITEMS

The present invention relates to labeling elements for items, which can be used in particular as security features in proof of authenticity and/or origin of different items.

Today, virtually all items, in particular items of known trademarks, can be copied with the corresponding amount of effort and can be put on the market as counterfeit products, giving rise to considerable financial losses. Such acts of infringement cause substantial efforts on the part of the original creator and producer in his/her attempt to undertake investigations and produce evidence.

Corresponding labelling represents an appropriate way of enabling proof of identity, respectively origin of such items. Such labels should be directly attached to or formed on the item itself, preferably in a tamper-proof manner, non-detachably and such that they cannot be destroyed.

Hologram labels, tracer technologies based on the RFID technology or generative methods, such as the application of fluorescent nanoparticles, have conventionally been used. In particular on well-established hologram labels, highly complex security elements, such as identigrams, kinegrams, computer-generated holograms or nanograms are employed. Hence, visual, sensory or microscopic means are available for the purpose of identification.

Usually computer-generated holograms are created with the aid of microstructures and nanostructures, which produce defined wavefronts and thus can provide a complex diffraction image as a security feature. The production of the microstructures and nanostructures usually can only be realized using complex, cost-intensive and complicated methods, such as the electron beam lithography.

In general, sophisticated algorithms are employed, such as the iterative Fourier transformation algorithm.

Complex, diffractive security elements (so-called pixograms) using selective surface structuring, which can be realized both directly and indirectly, can be used as an alternative to computer-generated holograms. The efforts involved in producing the complex, diffractive security elements is significantly lower both from a financial and temporal point of view compared to the existing holograms which are generated with the aid of computers.

A visual verification of diffractive security elements (pixograms) usually takes place by means of irradiation with monochromatic, electromagnetic radiation.

Thus, it is an object of the present invention to suggest possibilities for the recognition and identification of items and the origin thereof with a sufficient degree of security, whereby this should be realizable with little effort and at low costs.

According to the invention, this object is attained with a labeling element having the features of claim 1. Advantageous embodiments and further developments of the invention can be realized by means of the features as defined in the subordinated claims.

In the inventive labeling element for items, several pixels each having a periodic lattice structure, in particular a linear lattice structure, are formed on a surface of the labeling element. In individual pixels, lattice structures with in each case a structural period $\Lambda$ and an alignment of the structural elements, which are aligned to one another in a linear parallel fashion, at an angle $\varphi$ with respect to an axis of reference are formed such that when the pixels constituting the labeling element are irradiated with electromagnetic radiation, an image of the labeling element is created on an detector array or a surface, by means of imaging at least one order of the electromagnetic radiation diffracted by pixels.

The image can then be used for the identification of the respective labeling element.

The respective selection of the structural period $\Lambda$ and/or selection of the angle $\varphi$ make(s) it possible to influence in a defined manner the position of the electromagnetic radiation being diffracted and transmitted or reflected by the respective pixel in at least one order of diffraction. By suitably selecting at least one of these two parameters, structuring of the individual pixels of one labeling element can be selected such that the pattern of the pixels created on the surface of an item does not correspond to the two-dimensional structure or the structure of the labeling element. This means that it cannot be recognized as the respective labeling element when being viewed directly. The actual image of the labeling element with the imaged orders of diffraction of the pixels can only be recognized as such after diffraction of the electromagnetic radiation at the lattice-shaped structure.

Monochromatic radiation should be applied for the irradiation process, which is preferably emitted from a laser diode to the pixel-structured surface. In items of optically transparent materials, the image can be produced in the beam direction at the back of the item or else also with electromagnetic radiation reflected by the surface and diffracted at the structural elements.

It is also possible that pixels are present, which in each case additionally feature a varying structural depth of the linear structural elements. In this way, images can be realized which have different intensities in a locally defined manner and in a manner assigned to the correspondingly formed structural elements, which can lead to another option for differentiating usable labeling elements and to an increase of counterfeit safety.

The pixels of a labeling element can be created and should be created such that the labeling element as such is not discernible on the surface of the item without using optical aids. In this regard, in particular the pixels should not be readily discernible. This means that the pixels should not be visually perceptible without the use of magnifying optical means, in particular optical lenses.

The pixels can be of a circular or polygonal shape. The pixels for instance can be arranged in a row or column arrangement, in which varying numbers of pixels can be created in individual rows and columns.

The individually structured pixels each should occupy a surface of 1 mm$^2$ at a maximum. The structured total area (i.e. the sum of all individual pixels) can be of an arbitrary size.

The pixels should feature a structural period $\Lambda$ in the range of 0.01 µm to 50 µm and/or structural depths in the range of 0.001 µm to 10 µm.

In the evaluation, verification and imaging of diffracted electromagnetic radiation, at least electromagnetic radiation of one order of diffraction should be employed, preferably of the 1$^{st}$ order. However, it is also possible to use a combination of different orders of diffraction.

It is advantageous if at least a radiation source, a detector array and/or a display for displaying the image of the pixels form a unit with the respective order of diffraction. In this way, it is possible to create a single compact device, which enables verification of the identity of a labeling element with a requirement in a simple and time-saving manner. In this context, a radiation source can be disposed at a surface, by means of which electromagnetic radiation can be directed onto the surface furnished with the pixels formed with lattice-shaped structures. Electromagnetic radiation reflected and diffracted from there, then can impinge on a detector array arranged on the same side and there can be converted into electrical signals in a spatially resolved manner.

An optical display element can be provided on the rearward surface, by means of which the detected electrical signals enable the creation of an image of a labeling element, which can be recognized by a user and can be compared with a requirement. For the purpose of automation, pattern recognition can additionally be integrated, which makes it possible to attain verification of authenticity in an electronic manner. The verification result then can be indicated visually or else acoustically.

It is equally possible to employ several radiation sources of different wavelengths for the purpose of verification. Said radiation sources can direct electromagnetic radiation to wavelength-optimized, structured areas of a labeling element, so that in combination, wavelength-selective security features can be evaluated and taken into consideration in a verification process.

The creation of surface structuring embodied in the shape of an optical lattice of the individual pixels advantageously can be carried out using direct laser interference structuring (DLIP) known as such in a simple, cost-efficient and flexible manner. However, it is also possible to realize the structuring using a known embossing process in the surface of item materials suitable for this purpose. In this regard, embossing tools can be employed, which are manufactured for instance by replication of structural elements formed using DLIP.

The invention makes it possible to provide complex security features as a result of the attainable complex diffraction patterns as a labeling element. Verification, for instance for authenticity of an item, can be carried out using very simple optical aids at almost any location. Mobile devices can be used to this end.

The creation of a labeling element can be carried out directly on a surface of an item, however, can also be carried out on an item that can be joined with the respective item.

It is likewise possible to create the pixels constituting the labeling element in at least one surface of a material, which is covered by at least one other material, or within a boundary surface between the materials. The other material should feature a smaller absorption capacity, in particular an absorption capacity smaller by at least 50%, for the laser radiation used for forming the pixels, compared to that of the material being covered by the other material. Particularly preferably, the other material should not absorb the applied wavelength of the laser radiation. By means of selecting suitable material combinations and a wavelength of the applied laser radiation, the optical diffractive index can be changed in a locally defined manner in the surface area of the material which is covered by another material or in the boundary area between the two different materials. At this location, sublimation, i.e. the conversion of in particular polymeric material, in which the polymeric material is at least partially converted into the gaseous phase, can be attained. Gas can then remain between the two materials and realize the desired effect. However, melting-on or remelting can also be attained in a locally defined manner.

In particular when the pixels of a labeling element are created with the aid of direct use of laser beam interference, a suitable focussing of the applied partial beams onto the surface of the material, which is covered by another material, or a boundary area which is formed by the one and an other material, into the corresponding plane can be selected, in order to be able to form very fine and delicate structures of a labeling element.

The at least one other material should be a polymer, in particular a polymer film. The materials should be integrally joined to one another, preferably with the aid of an organic binder.

For this reason, a part can be formed of a material which on two oppositely arranged surfaces is each covered by another material. The other materials can be the same or can be different.

Combinations of different polymers can be the polymeric materials. Hence, polymethylmethacrylate (PMMA) with the other material polycarbonate (PC), PMMA with polypropylene (PP) as well as PMMA with polyethylene (PET) at a wavelength of laser radiation of 266 nm or 263 nm, PMMA and polyimide (PI) as well as PMMA and polyetheretherketone (PEEK) PET and PI as well as PP and PI at a wavelength of 355 nm can be processed correspondingly. Thereby, the respectively first mentioned polymer constitutes the other material which covers a material.

Hereinafter, the invention will be described exemplarily in greater detail.

In the drawings,

FIG. 1 schematically shows an example formed with pixels of a labeling element and a structure for verification of the identity of the labeling element;

FIGS. 2a-c schematically show the influence of different structural periods Λ and angles φ of the structural orientation at a position of an image of the respective pixel, which is diffracted at a pixel;

Figure 9:
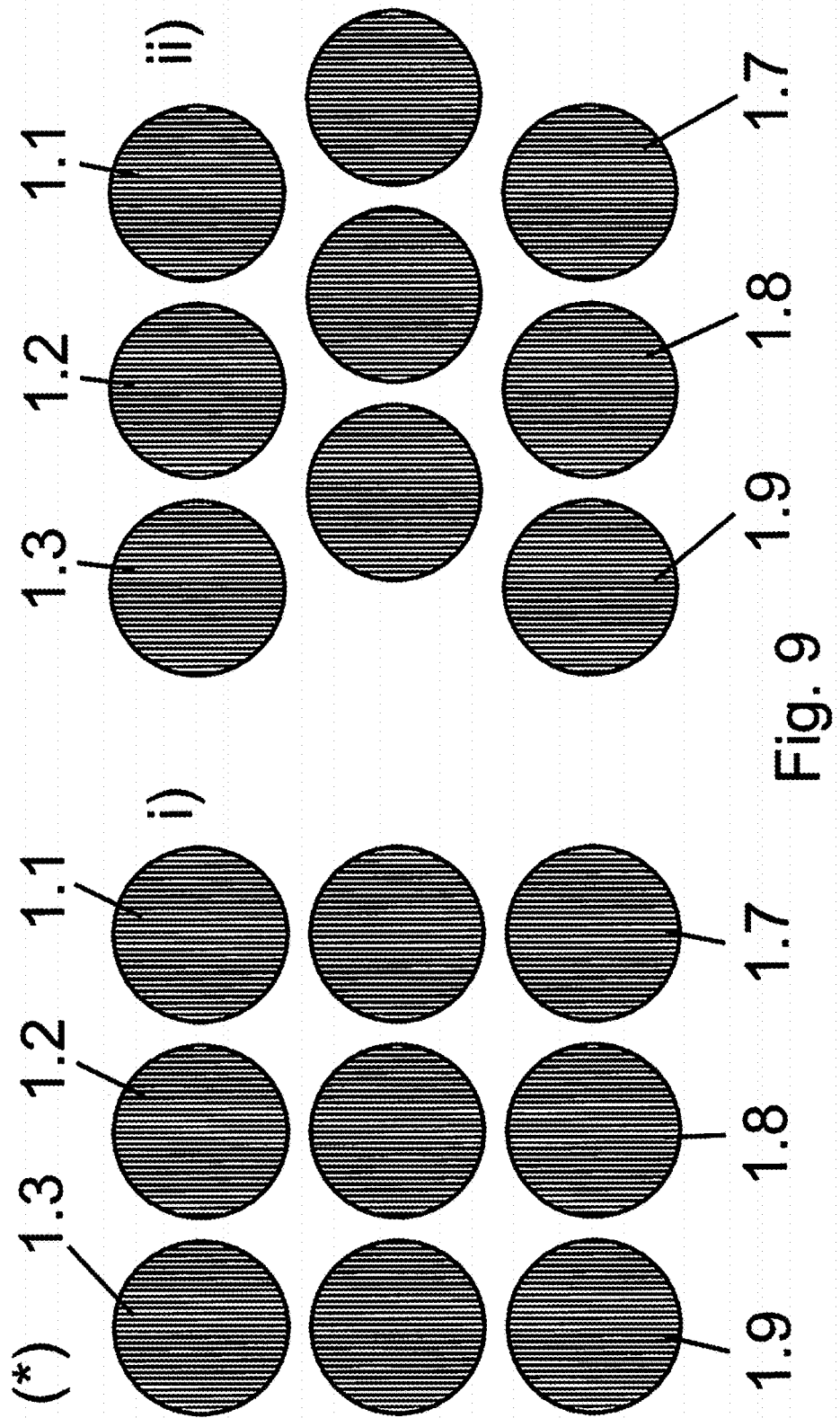

FIGS. 6a+b are a schematic view of how two partial beams for creating pixels of a labeling element are directed onto the surface of a material M1 through another material M2;

FIGS. 7a+b schematically show the creation of structural elements at two opposite surfaces of a material which at both oppositely arranged surfaces is covered by another material;

FIG. 8 is a schematic view of structural elements for a labeling element with suitable dimensioning, which can be formed with the aid of direct laser interference structuring (DLIP), and FIG. 9 is a schematic view of possibilities for arranging individual structural elements with pixels which can be employed using DLIP for the creation of a labeling element.

Figure 1:
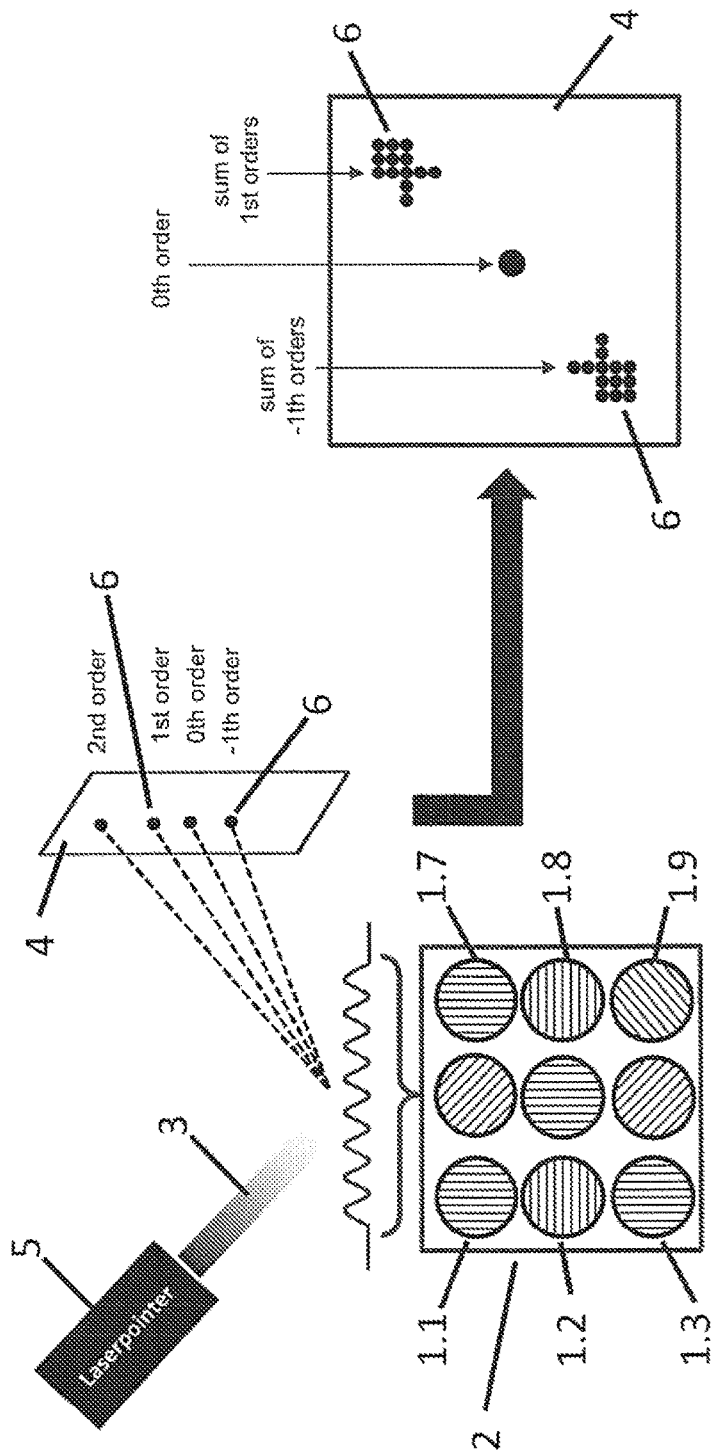

FIG. 1 shows an example of a labeling element 2 with nine pixels 1.1 to 1.9 in a plan view and in a side view. The pixels 1.1 to 1.9 each have been formed as a structured circular surface with respectively one linear lattice shape using DLIP. It can be seen from the plan view that the alignment of the lattice structures has been selected in different angles/orientations. Above the plan view as shown in FIG. 1, a correspondingly structured surface of an item is shown. Monochromatic electromagnetic radiation 3 from a laser diode serving as a radiation source 5 is directed onto said structured surface. The electromagnetic radiation diffracted and reflected at the structured surface of the pixels 1.1 to 1.9 constituting the labeling element 2 impinges on a detector array 4, with which the intensities can be detected in a spatially resolved manner. As is apparent from the upper representation in FIG. 1, images 6 can be detected in this way in several orders of diffraction. For the purpose of verification, it can be sufficient to consider merely one order of diffraction, preferably the $1^{st}$ order.

The representation on the right in FIG. 1 renders apparent how the image 6 of the pixels 1.1 to 1.9 at the detector array 4 may look like. Thereby, after reflection and diffraction, imaging of the pixels 1.1 to 1.9 takes place by the respective selection of the structural period Λ and the angle φ for the alignment of the linear lattice structure of the individual pixels and at least one image 6 of the entire labeling element 2 can be considered in the $1^{st}$ order of diffraction for a verification of authenticity. In this representation, two images 6 of the respectively $1^{st}$ order of diffraction of the labeling element are shown.

The image(s) 6 correspond to the respectively given labeling element 2. The irradiation with electromagnetic radiation 3 can be carried out at different angles. Depending on the selected angle only the position of the entire image 6 changes.

Figure 2:
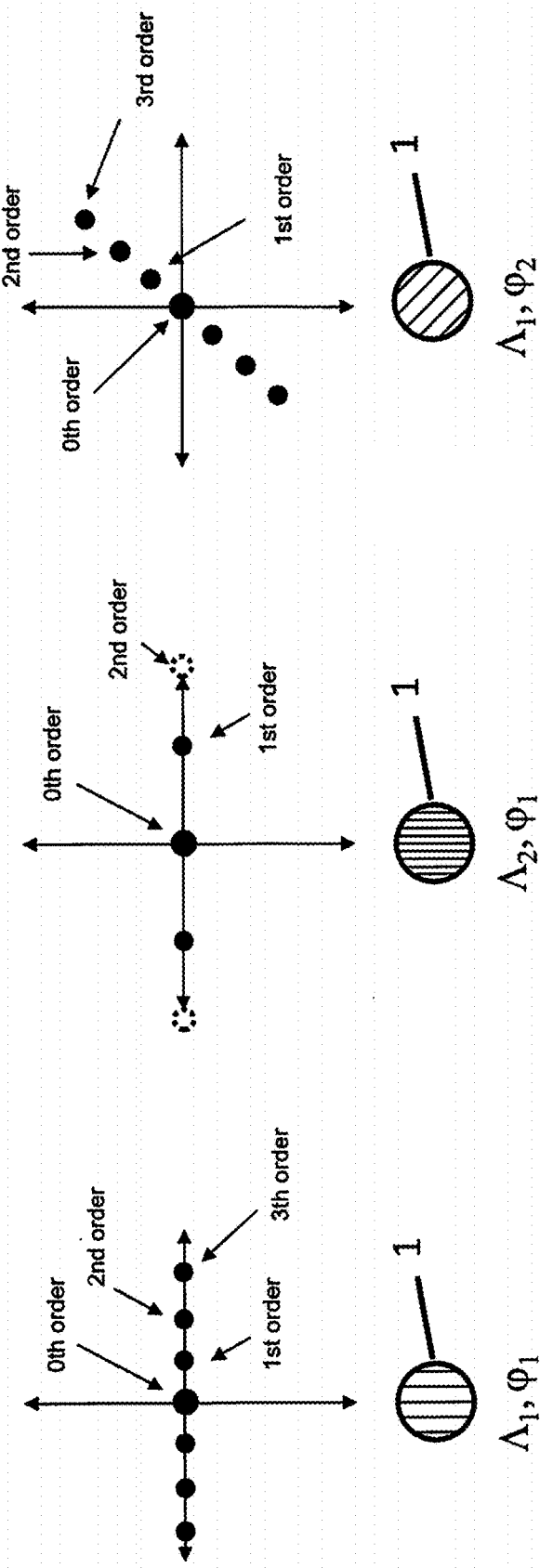

The influence of a changed structural period Λ on a position of an image of an order is apparent from the representations in FIGS. 2a and 2b. Hence, the structural period $Λ_1$ was larger than the structural period $Λ_2$. The distance of the image of a pixel 1 after diffraction at the lattice structure from a zero point of a Cartesian coordinate system hence changes as a function of the respective structural period Λ in an axial direction.

It is clear from FIG. 2c that the angle φ, with which the linear lattice structure has been formed aligned with respect to an axis of a coordinate system, also has an influence on the position of the image of a pixel 1 after diffraction of electromagnetic radiation at the linear lattice structure. In the representations according to FIGS. 2a to 2c, the angle $φ_1$ has a value of 90° with respect to an x axis of a coordinate system and the angle $φ_2$ has a value of 135° with respect to the x axis of a coordinate system. This results in that the images of the orders of diffraction of one pixel 1 with the structural period $Λ_1$ and an angle $φ_2$ are not arranged on an axis on which the corresponding images of orders of diffraction with structural periods $Λ_1$ and $Λ_2$ and the angle $φ_1$ are disposed. Hence, the respective positions of images of pixels can be influenced after the optical diffraction by a suitable selection of the structural period Λ and/or the angle φ of the individual pixels 1.

Figure 3:
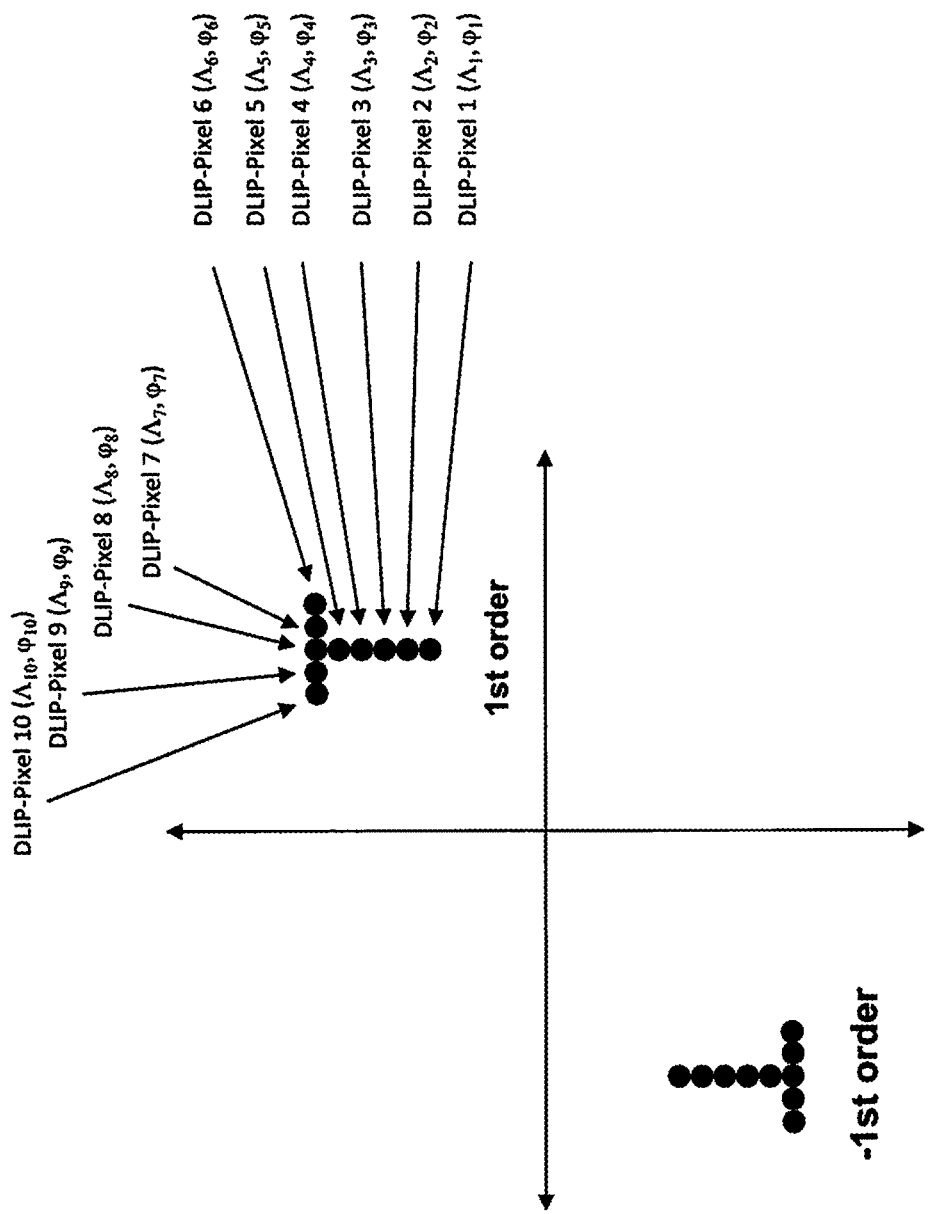
FIG. 3 shows the image of 10 pixels constituting a T-shaped labeling element in the first order of diffraction.

FIG. 3 shows a coordinate system, in which an image 6 of the $1^{st}$ order of diffraction of 10 pixels resulted in a T-shaped labeling element 2. In the individual images of pixels, different values for the structural period Λ and angle φ have been selected in each case, so that each pixel is imaged respectively assigned to the respective labeling element after the diffraction at the desired position, and in this example, the labeling element 2 has the shape of a "T". As a matter of course, by means of a varying the number of pixels, the arrangement of which on a surface, the respective selection of the structural period Λ and the angle φ of the respective linear lattice structure, labeling elements 2 with most varied configurations can be provided as well.

Hence, in the shown example, the structural period Λ in the range of 1.2 µm up to 1.6 µm and the angle φ in the range of 24° to 52° can be varied for individual pixels. The structural depth of linear lattice structures can be kept constant in the range of 0.001 µm to 10 µm, and thereby also for all pixels which are assigned to one labeling element 2.

Figure 4:
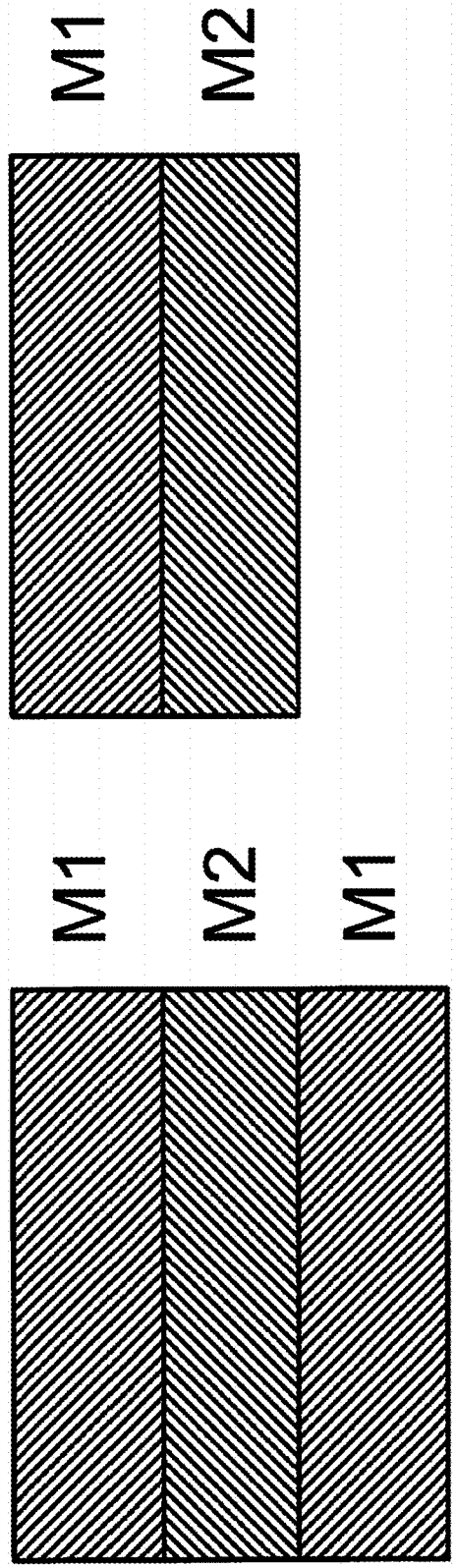
FIG. 4 shows examples in which a material is covered by another material at one or at both oppositely arranged surfaces.

FIG. 4 on the right shows an arrangement, in which a material M2 is covered by another material M1. The representation on the left shows an arrangement, in which a material M2 is covered by another material M1 at two opposite surfaces. A material can also be covered at two opposite sides by other materials, and the other materials are thereby different. In FIG. 4, the materials M1 and M2 are arranged directly above one another without any gap. However, an arrangement at a distance from one another is also possible. Thereby, materials can be fixed at outer surfaces with the aid of a frame.

Figure 5:
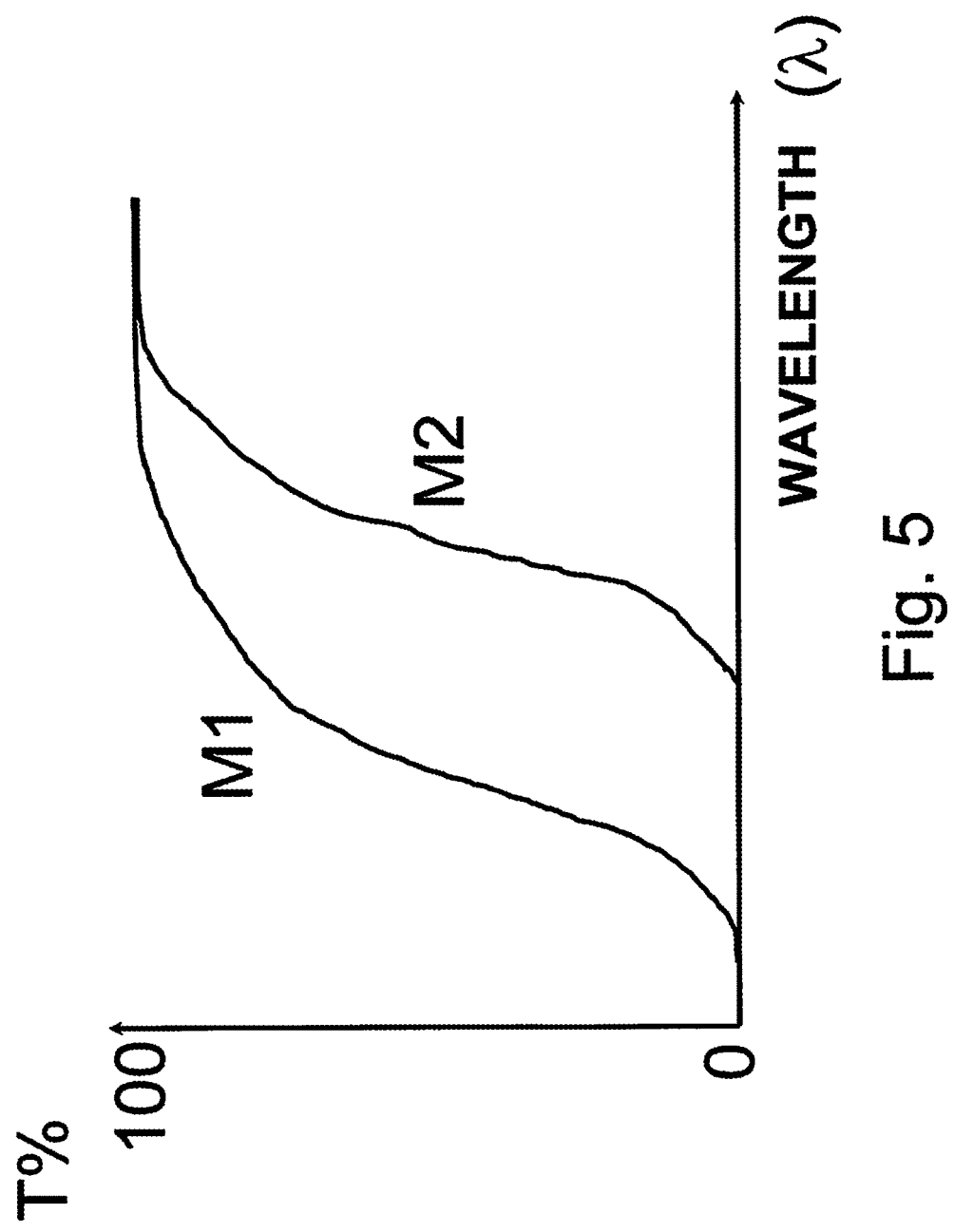
FIG. 5 shows a diagram reflecting the optical transparency and thus conversely the absorption behavior as a function of the respective wavelength for a material M1 and another material M2.

The diagram shown in FIG. 5 reflects the differences of the wavelength-dependent transparency for electromagnetic radiation for different materials M1 and M2. Preferably, it is thus possible to use a wavelength, which is highlighted with the line labelled M2, for imaging a labeling element in a material M2.

Figure 6B:
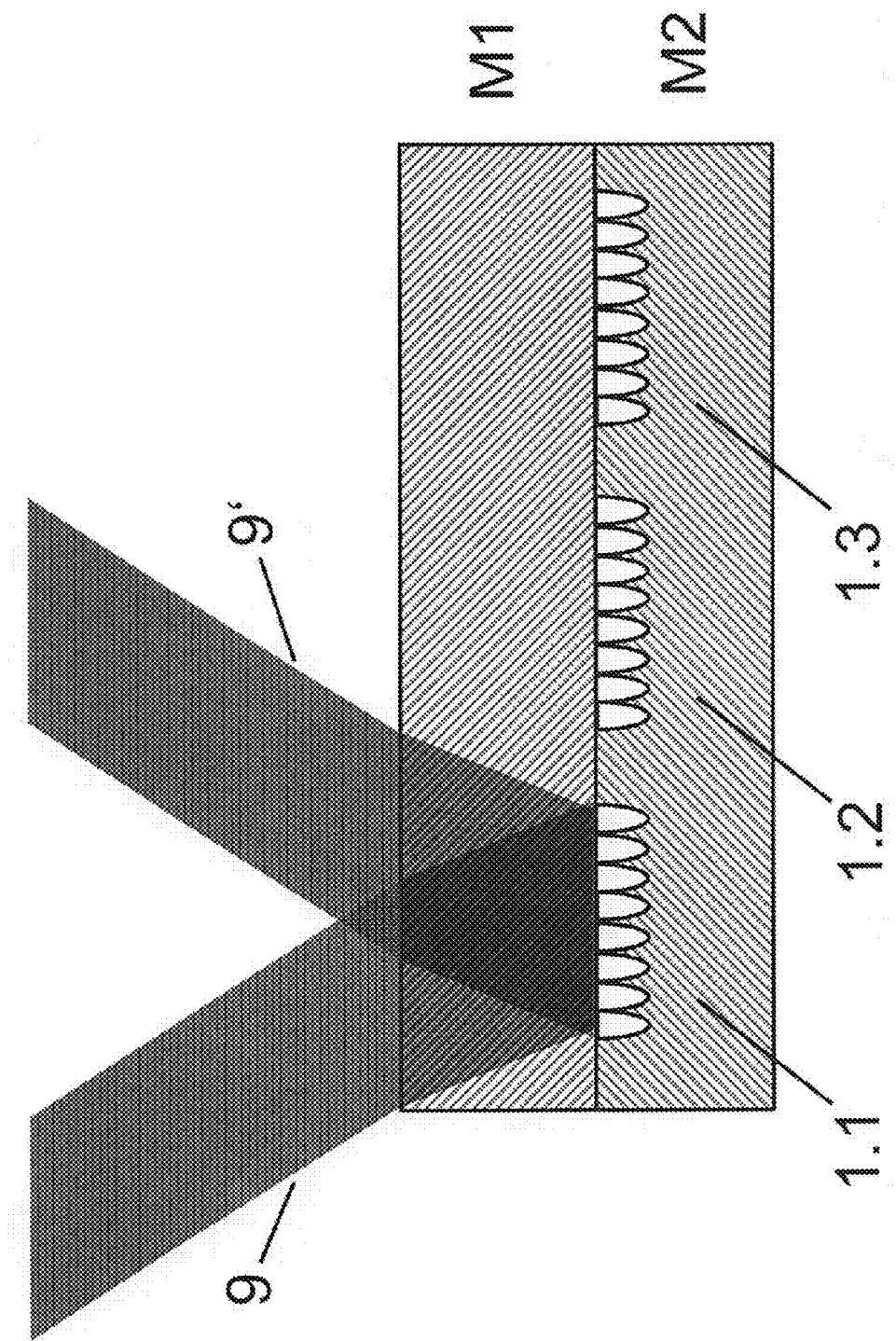

FIGS. 6a and 6b show how the structural elements can be formed in the surface of a Material M2 using DLIP with individual pixels 1.1 to 1.3, while several partial beams 9 and 9' can be simultaneously directed in a locally defined manner onto the surface of a material M2 through another material M1 covering this material. Thereby, the material M1 absorbs the electromagnetic laser radiation at the selected wavelength λ by at least 80%, preferably almost 100%, whereas the other material M2 does not absorb the electromagnetic radiation with the respective wavelength at all or by 40% at a maximum.

Figure 7B:
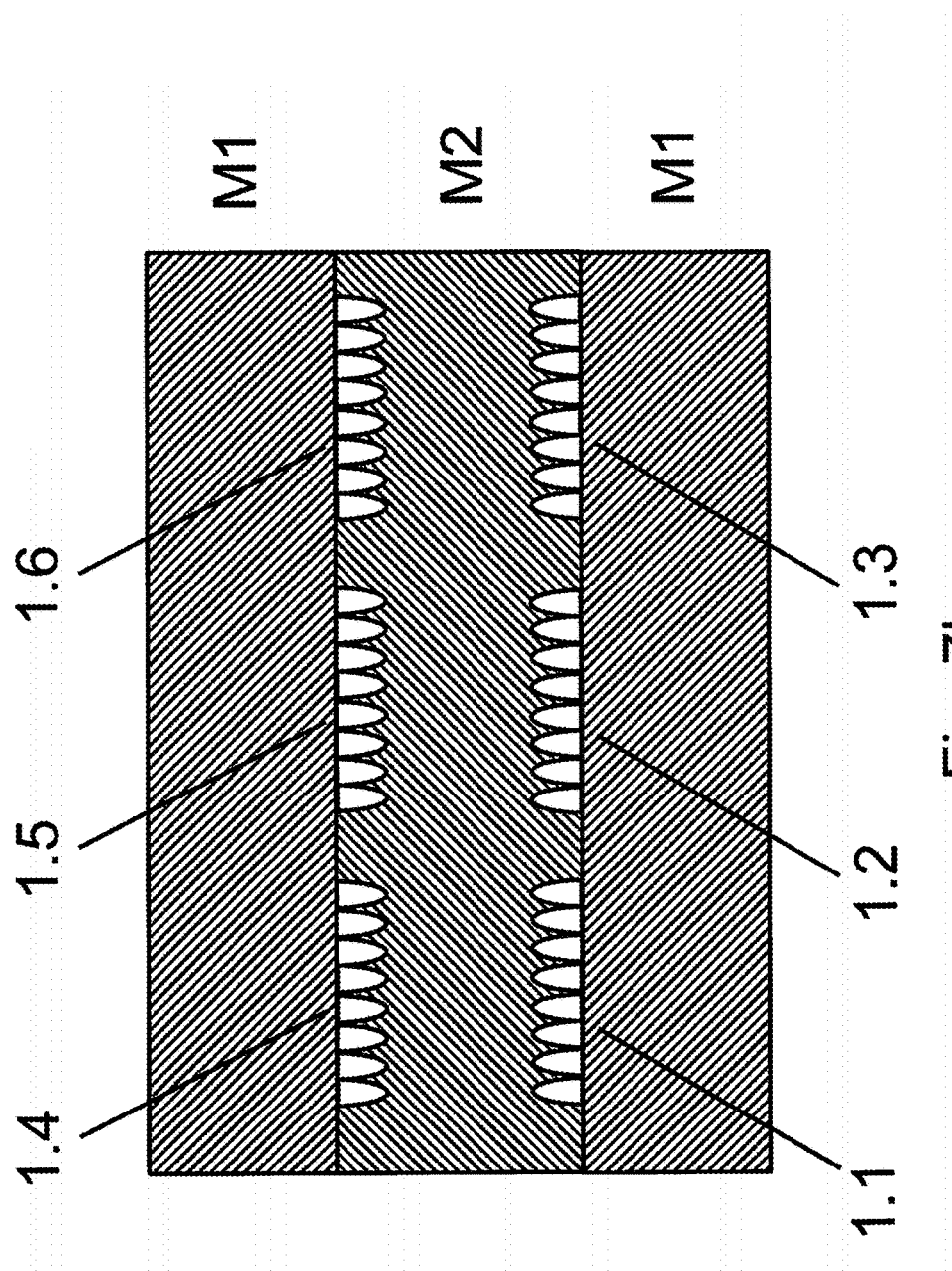

FIGS. 7a and 7b show how the pixels 1.1 to 1.6 have been formed at two oppositely arranged surfaces of a material M2 to form a labeling element. In this case, they form a nearly identical pattern, since they have been formed mirrored to the center axis of the material M2. However, an offset arrangement of pixels 1.1 to 1.3, 1.4 to 1.6 and 1.7 to 1.9 is likewise possible. This is indicated by the representations in FIG. 9 (on the left, symmetrical at a surface of a material M2, and at the right, offset to one another in rows at a surface or above one another at two surfaces of a material M2). It can be seen from FIG. 8 that individual pixels 1.1 to 1.3 can appropriately form structural elements 10 with a lateral dimensioning D in an axial direction with 2 µm to 20 mm with a distance A from one another of 0 nm to 20,000 µm, preferably of 100 nm to 50 µm. Individual pixels can be formed with a dimensioning Λ in the range of 100 nm to 50 µm.

The invention claimed is:

1. Labeling element for items, which on a surface thereof is formed with a plurality of pixels each pixel having a lattice structure, and wherein said lattice structure within each pixel include linear structural elements having a structural period Λ between said linear structural elements, which are aligned to one another in a linear parallel manner, and at an angle φ with respect to an axis of reference, wherein the pixels are formed in at least one surface of a material (M2), which is covered by at least one other material (M1), or are formed within a boundary between the materials (M1 and M2), wherein said one other material (M1) has an absorption capacity being smaller by at least 50% for the laser radiation used for forming the pixels, compared to that of the material (M2) which is covered by said one other material (M1), such that when the pixels constituting the labeling element (2) are irradiated with electromagnetic radiation (3), an image (6) of the labeling element is created on a detector array (4) or a surface, whereby images of at least one order of diffraction of the electromagnetic radiation (3) diffracted by said pixels can be used for identification of the labeling element (2).

2. Labeling element according to claim 1, characterized in that the linear structural elements within each pixel can have varying structural depths.

3. Labeling element according to claim 1, characterized in that the labeling element (2) is not discernible on the surface of the item without using optical aids.

4. Labeling element according to claim 1, characterized in that the pixels have a circular or polygonal shape.

5. Labeling element according to claim 1, wherein the individual pixels occupy a surface of 1 mm$^2$ at a maximum.

6. Labeling element according to claim 1, characterized in that the pixels have a structural period $\Lambda$ in the range of 0.01 µm to 50 µm and structural depths in the range of 0.001 µm to 10 µm.

7. Labeling element according to claim 1, characterized in that electromagnetic radiation of at least one order of diffraction is used to create the image (6) of diffracted electromagnetic radiation.

8. Labeling element according to claim 1, characterized in that the at least said one other material (M1) is a polymer.

9. Labeling element according to claim 1, characterized in that the materials (M1 and M2) are integrally joined to one another.

* * * * *